(12) United States Patent
Fukunaga

(10) Patent No.: US 8,884,210 B2
(45) Date of Patent: Nov. 11, 2014

(54) SPECTRUM INFORMATION MEASUREMENT METHOD, COLOR SENSOR AND VIRTUAL SLIDE DEVICE

(75) Inventor: Yasuhiro Fukunaga, Tokyo (JP)

(73) Assignee: Olympus Corporation, Tokyo (JP)

( * ) Notice: Subject to any disclaimer, the term of this patent is extended or adjusted under 35 U.S.C. 154(b) by 445 days.

(21) Appl. No.: 13/238,542

(22) Filed: Sep. 21, 2011

(65) Prior Publication Data

US 2012/0075631 A1   Mar. 29, 2012

(30) Foreign Application Priority Data

Sep. 27, 2010 (JP) .................................. 2010-215905

(51) Int. Cl.
*G01J 3/51* (2006.01)
*G01J 1/46* (2006.01)

(52) U.S. Cl.
CPC ........... *G01J 3/513* (2013.01); *H04N 2209/045* (2013.01); *G01J 1/46* (2013.01)
USPC ............................ 250/226; 356/402; 348/272

(58) Field of Classification Search
CPC ... H04N 2209/045; H04N 1/56; H04N 3/155; G01J 3/513
USPC .................... 250/208.1–208.2, 226; 382/167; 348/229.1, 272
See application file for complete search history.

(56) References Cited

U.S. PATENT DOCUMENTS

| | | | |
|---|---|---|---|
| 2002/0044209 A1* | 4/2002 | Saito | 348/280 |
| 2003/0086008 A1* | 5/2003 | Nagano | 348/272 |
| 2005/0248667 A1* | 11/2005 | Schweng et al. | 348/273 |
| 2008/0130073 A1* | 6/2008 | Compton et al. | 358/512 |

FOREIGN PATENT DOCUMENTS

| | | |
|---|---|---|
| JP | 63-288580 A | 11/1988 |
| JP | 5-207220 A | 8/1993 |
| JP | 2007-336157 A | 12/2007 |
| JP | 2008-22521 A | 1/2008 |
| WO | 2006/004096 A2 | 1/2006 |

OTHER PUBLICATIONS

Japanese Office Action dated Mar. 4, 2014, issued in corresponding Japanese Patent Application No. 2010-215905 with English translation (8 pages).
Office Action dated Sep. 2, 2014, issued in corresponding Japanese application No. 2010-215905, with English Translation.

* cited by examiner

*Primary Examiner* — Kara E Geisel
(74) *Attorney, Agent, or Firm* — Westerman, Hattori, Daniels & Adrian, LLP

(57) ABSTRACT

A spectrum information measurement method may include steps of; controlling a reference pixel accumulating charges based on an amount of light irradiated from a test specimen; controlling a plurality of measurement pixels accumulating the charge based on an amount of light that is irradiated from the test specimen and has a prescribed wavelength; generating and outputting a reference signal based on an amount of change in the charge that is accumulated in the reference pixel over the prescribed measurement time; generating and outputting a plurality of measurement signals based on an amount of change in the charge that is accumulated in each of the plurality of measurement pixels over the prescribed measurement time; determining whether or not any one or more of the plurality of measurement signals is greater than the reference signal, and determining that the measurement signal that is greater than the reference signal includes saturated output.

7 Claims, 10 Drawing Sheets

SPECTRUM INFORMATION MEASUREMENT METHOD, COLOR SENSOR AND VIRTUAL SLIDE DEVICE

BACKGROUND OF THE INVENTION

1. Field of the Invention

The present invention relates to a spectrum information measurement method, a color sensor, and a virtual slide device.

Priority is claimed on Japanese Patent Application No. 2010-215905, filed Sep. 27, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A reading circuit that reads at a high level of sensitivity while removing switching noise at the same time is disclosed in Japanese Unexamined Patent Application, First Publication No. 2007-336157 as an example of a reading circuit of a color sensor that is used to acquire spectrum information about a test specimen. The structure of a conventionally known solid-state imaging device will now be described with reference made to FIG. 8. FIG. 8 is a schematic view illustrating the structure of a conventionally known solid-state imaging device. In the example shown in the drawing, a solid-state imaging device 100 is formed by an integrated circuit unit B1, a CDS (Correlated Double Sampling) circuit unit B2, and an S/H (Sample Hold) circuit unit B3.

In the integrated circuit unit B1, an anode of a photodiode 10 that is used to receive light and generate photoelectric current is connected to a non-inverting input terminal of an operational amplifier 50, while a cathode of this photodiode 10 is connected to an inverting input terminal of the operational amplifier 50. The non-inverting input terminal of the operational amplifier 50 is connected to a reference voltage supply 20. In addition, an integrating capacitor 40 that is used to accumulate photoelectric current and a switching device 30 that is used to control the integration time are connected in parallel between the inverting input terminal and an output terminal of the operational amplifier 50.

In the CDS circuit unit B2, one end of a capacitance element 60 is connected to the output terminal of the operational amplifier 50 forming part of the pixel unit B1, while the other end of the capacitance element 60 is connected to an inverting input terminal of an operational amplifier 90. A non-inverting input terminal of the operational amplifier 90 is connected to a reference voltage supply 70. One end of a capacitance element 80 is connected to an inverting input terminal of the operational amplifier 90, while the other end of the capacitance element 80 is connected to one end of a switching device 120 and one end of a switching device 140. The other end of the switching device 120 is connected to a reference voltage supply 130, while the other end of the switching device 140 is connected to an output terminal of the operational amplifier 90. One end of a switching device 110 is connected to one end of the capacitance element 80 and to a connection point between the inverting input terminal of the operational amplifier 90 and the capacitance element 60, while the other end of the switching device 110 is connected to the output terminal of the operational amplifier 90.

In the S/H circuit unit B3, one end of a switching element 150 is connected to the output terminal of the operational amplifier 90 forming part of the CDS circuit unit B2, while the other end of the switching element 150 is connected to a non-inverting input terminal of an operational amplifier 170. One end of a sample hold capacitance element 160 is connected to the non-inverting input terminal of the operational amplifier 170, while the other end of the capacitance element 160 is grounded. A signal output terminal 180 connects together the inverting input terminal and the output terminal of the operational amplifier 170, and is connected to the output terminal of the operational amplifier 170.

Operations of the solid-state imaging device will now be described with reference made to the timing chart shown in FIG. 9. FIG. 9 is a timing chart illustrating the operation timings of a conventionally known solid-state imaging device 100. On this timing chart, the respective switching devices are in a conductive state in the High-level intervals on the chart, and are in a non-conductive state in the Low-level intervals on the chart. $\phi R$ shows the switch control timing of a switching device 30, $\phi RC$ shows the switch control timings of switching devices 110 and 120, $\phi T$ shows the switch control timing of a switching device 140, and $\phi SH$ shows the switch control timing of a switching device 150. A voltage V1 shows the voltage of the output terminal of the operational amplifier 50, while a voltage V2 shows the voltage of the output terminal of the operational amplifier 90, and a voltage Vout shows the voltage of the signal output terminal 180. Four time periods, namely, T1 through T4 are formed in the time axis direction.

The time period T1 is a reset period, and $\phi R$, $\phi RC$, and $\phi SH$ are set to a High state, while $\phi T$ is set to a Low state. In the time period T1, the voltage V1 changes to the voltage Vr1 of the reference voltage supply 20, the voltage V2 changes to the voltage Vr2 of the reference voltage supply 70, and the voltage Vout is equivalent to the voltage Vr2 of the output terminal of the CDS circuit unit B2.

In the time period T2, $\phi RC$ and $\phi SH$ are set to a High state, while $\phi R$ and $\phi T$ are set to a Low state. Photoelectric current generated by the photodiode 10 is accumulated in the capacitance element 40. At this time, if the elapsed time from the point when $\phi RC$ was first set to a High state is taken as TINTGW, then the voltage V1 of the output terminal of the pixel unit B1 is shown by the following Formula (1).

$$V1 = Vr1 + (Ipd \times TINTGW)/C0 \quad (1)$$

Here, the value of the capacitance of the capacitance element 40 is C0, the amount of photoelectric current generated by the photodiode 10 is Ipd, and the voltage of the reference voltage supply 20 is Vr1.

However, in actual fact, clock feedthrough which is caused by the switching operations of the switching device 30 is superimposed on the voltage V1 of the output terminal of the pixel unit B1. As a result, the voltage V1 changes in the manner shown in Formula (2).

$$V1 = Vr1 + (Ipd \times TINTGW)/C0 + Vn \quad (2)$$

Here, the voltage changes caused by the clock feedthrough unit are shown as Vn.

In the time period T3, $\phi T$ and $\phi SH$ are set to a High state, while $\phi R$ and $\phi RC$ are set to a Low state. At this time, the voltage V1 of the output terminal of the pixel unit B1 is shown by the following Formula (3).

$$V1 = Vr1 + (Ipd \times TINTG)/C0 + Vn \quad (3)$$

Here, the elapsed time from the point when $\phi R$ and $\phi RC$ were first set to a Low state is taken as TINT.

In this period, the switching devices 140 and 150 are in a conductive state, while the switching devices 110 and 120 are in a non-conductive state, and the voltage V2 of the output terminal of the CDS circuit unit B2 temporarily changes to the voltage Vr3 of the reference voltage supply 130. Thereafter, because the operational amplifier 90 and the capacitance elements 60 and 80 make up a charge amplifier circuit, the voltage V2 of the output terminal of the CDS circuit unit B2 can be shown by Formula (4).

$$V2 = Vr3 - (C1/C2) \times (Ipd \times TINTG)/C0 \quad (4)$$

Here, the value of the capacitance of the capacitance element 60 is taken as C1, while the value of the capacitance of the capacitance element 80 is taken as C2.

During this period, the switching device 150 is in a conductive state, and the operational amplifier 170 forms a voltage follower circuit. In addition, the voltage Vout of the signal output terminal 180 has the same voltage as the voltage V2 of the output terminal of the CDS circuit unit B2. Accordingly, the voltage Vout of the signal output terminal 180 is shown by the following Formula (5).

$$Vout = Vr3 - (C1/C2) \times (Ipd \times TINTG)/C0 \quad (5)$$

As a result of the operations during this period, the clock feedthrough voltage Vn which is caused by the switching operations of the switching device 30 can be removed.

In the time period T4, φR and φRC are set to a High state, while φT and φSH are set to a Low state. The switching device 150 is in a non-conductive state, and the voltage shown by Formula (5) is maintained in the signal output terminal 180. It is possible for the signal to be amplified by the capacitance ratio of the capacitance element of the CDS circuit unit B2 and then read. Any reset noise caused by the switching operations of the switching device 30 which is connected to the capacitance element 40 of the pixel unit B1 can be removed by a correlated double reading of the CDS circuit unit B2.

A conventionally known solid-state imaging device can be used as a color sensor. FIG. 10 is a schematic view illustrating the structure of a color sensor to which a conventionally known solid-state imaging device has been applied to. In a color sensor 200 shown in the drawing, a circuit corresponding to the integrated circuit unit B1 of the conventionally known solid-state imaging device 100 is shown as an integrated circuit unit B10, while a circuit corresponding to the CDS integrated circuit unit B2 of the conventionally known solid-state imaging device 100 is shown as an integrated circuit unit B20. Note that there is no depiction of any circuit that corresponds to the conventionally known S/D circuit unit B3.

In the example shown in the drawing, the color sensor 200 includes integrated circuit units B10-1 to B10-6, gain circuits B20-1 to B20-6, integration time calculation units 38-1 to 38-6, gain calculation units 39-1 to 39-6, and a drive control circuit 310. The integrated circuit units B10-1 to B10-6 include pixels 31-1 to 31-6 that detect spectrum information about a subject by dividing it into respective wavelength transmission bands, reference voltage terminals 32-1 to 32-6, switching elements 33-1 to 33-6, capacitance elements 34-1 to 34-6, and operational amplifiers 35-1 to 35-6. Portions formed by the reference voltage terminals 32-1 to 32-6, switching elements 33-1 to 33-6, capacitance elements 34-1 to 34-6, and operational amplifiers 35-1 to 35-6 are called read circuits 30-1 to 30-6.

In the drawing an example is shown in which the pixels 31-1 to 31-6 provided in the integrated circuit units B10-1 to B10-6 detect six colors, namely, violet, blue, green, yellow, red, and orange. Specifically, the pixel 31-1 provided in the integrated circuit unit B10-1 is a pixel that detects violet light. The pixel 31-2 provided in the integrated circuit unit B10-2 is a pixel that detects blue light. The pixel 31-3 provided in the integrated circuit unit B10-3 is a pixel that detects green light. The pixel 31-4 provided in the integrated circuit unit B10-4 is a pixel that detects yellow light. The pixel 31-5 provided in the integrated circuit unit B10-5 is a pixel that detects red light. The pixel 31-6 provided in the integrated circuit unit B10-6 is a pixel that detects orange light.

In the color sensor 200, light from a subject is irradiated onto the pixels 31-1 to 31-6. The color sensor 200 also controls the integration time in the switching elements 33-1 to 33-6 using as a reference a reference voltage which is applied to the reference voltage terminals 32-1 to 32-6, and integrates the light from the subject as voltage changes that correspond to the photoelectric current in the capacitance elements 34-1 to 34-6. It then outputs the results to output terminals of the operational amplifiers 35-1 to 35-6.

The color sensor 200 amplifies output changes from the output terminals of the operational amplifiers 35-1 to 35-6 using the gain circuits 36-1 to 36-6, and then reads them. The integration times of each of the integrated circuit units B10-1 to B10-6 are calculated by the integration time calculation units 38-1 to 38-6 using information sent from the drive control circuit 310. The gains of the respective gain circuits 36-1 to 36-6 are calculated by the gain calculation units 39-1 to 39-6 using information sent from the drive control circuit 310. As a result of this, output signals are output from the output terminals 37-1 to 37-6 for the integration time and the gain that are set by the integration time calculation units 38-1 to 38-6 and the gain calculation units 39-1 to 39-6.

The spectral characteristics of a multiband color sensor will now be described. FIG. 11 is a graph illustrating the spectral characteristics of a multiband color sensor that is formed by coating color filters on the front surface of a light receiving element (i.e., a photodiode or pixel) of a light sensor in order to detect spectrum information about a test specimen. This graph shows a curve 2001 that shows the transmittance of a color filter that has been coated on the front surface of a color sensor that detects violet light, a curve 2002 that shows the transmittance of a color filter that has been coated on the front surface of the color sensor that detects blue light, a curve 2003 that shows the transmittance of a color filter that has been coated on the front surface of the color sensor that detects green light, a curve 2004 that shows the transmittance of a color filter that has been coated on the front surface of the color sensor that detects yellow light, and a curve 2005 that shows the transmittance of a color filter that has been coated on the front surface of the color sensor that detects red light. In this manner, the wavelengths of the light transmitted through each color filter differ in accordance with the color of the detected light.

FIGS. 12A and 12B are timing charts illustrating the operation timings of a color sensor 200 to which a conventionally known solid-state imaging device has been applied. FIG. 12A is the timing chart obtained when the color sensor 200 acquires spectrum information normally. FIG. 12B is the timing chart obtained when a fixed quantity of light or more is irradiated onto the color sensor 200.

If less than the fixed quantity of light is irradiated onto the color sensor 200, then in the same way as was described using the timing chart illustrating the operation timings of the conventionally known solid-state imaging device 100 shown in FIG. 9, as is shown in FIG. 12A, the color sensor 200 is able to acquire spectrum information normally.

However, when a fixed quantity or more of light is irradiated onto a specific pixel in a sensor having spectral characteristics such as those shown in FIG. 11, then as is shown in FIG. 12B, V1 becomes saturated in the time period T2. At this time, because there are no voltage changes in the time period T3, the final output voltage V2 changes to zero and shows a false value. It is not possible to determine in this case whether the reference voltage was output with the zero changes in voltage being due to there being few irradiated wavelength components, or whether the reference voltage was output when saturation was reached in the time period T2 as a result of a fixed amount of light or more being irradiated.

FIG. 13 is a graph illustrating a relationship between the amount of light and the output when the output from the gain circuits 36-1 to 36-6 dropped to zero when a fixed quantity or more of light was irradiated onto the color sensor 200. The horizontal axis in the graph shows the amount of light, while the vertical axis shows the output from the gain circuits 36-1 to 36-6. As is shown in the drawing, when the amount of light of the wavelength component irradiated onto a particular pixel of the color sensor 200 was a fixed amount of light or more, the output of the gain circuits 36-1 to 36-6 did not reach the saturation level output which is shown in the graph by the dotted line, and as is shown by the solid line, there was no saturation output and the amount of irradiated light dropped to zero. Because of this, false spectrum information is acquired by the color sensor 200, and it is not possible for accurate spectrum information to be acquired.

SUMMARY

The present invention provides a spectrum information measurement method, a color sensor, and a virtual slide device that make it possible to acquire spectrum information about a subject more accurately.

A spectrum information measurement method may include steps of: controlling a reference pixel accumulating charges for a prescribed measurement time, the reference pixel accumulating the charges based on an amount of light irradiated from a test specimen; controlling a plurality of measurement pixels accumulating the charge for the prescribed measurement time, the plurality of measurement pixels accumulating the charge based on an amount of light that is irradiated from the test specimen and has a prescribed wavelength; generating and outputting a reference signal based on an amount of change in the charge that is accumulated in the reference pixel over the prescribed measurement time; generating and outputting a plurality of measurement signals based on an amount of change in the charge that is accumulated in each of the plurality of measurement pixels over the prescribed measurement time; determining whether or not any one or more of the plurality of measurement signals is greater than the reference signal, and determining that the measurement signal that is greater than the reference signal includes saturated output.

The spectrum information measurement method may further include a step of: determining that each one of the plurality of measurement signals is minimum value output if the reference signal and the plurality of measurement signals are all less than a prescribed value.

The prescribed value may be zero.

The spectrum information measurement method may further include a step of: discarding the reference signal and the plurality of measurement signals and lowering sensitivities of the reference pixel and the plurality of measurement pixels if it is determined that the saturated output is contained in the plurality of measurement signals.

The spectrum information measurement method may further include a step of: discarding the reference signal and the plurality of measurement signals and raising sensitivities of the reference pixel and the plurality of measurement pixels if it is determined that the minimum value output is contained in the plurality of measurement signals.

A color sensor may include: a reference pixel that accumulates a charge based on an amount of light irradiated from a test specimen; a plurality of measurement pixels that accumulate a charge based on an amount of light that is irradiated from the test specimen and has a prescribed wavelength; a drive control circuit that controls the reference pixel and the plurality of measurement pixels accumulating the charge for a prescribed measurement time; a reference signal generation circuit that generates and outputs a reference signal based on an amount of change in the charge accumulated in the reference pixel for the prescribed measurement time; a plurality of measurement signal generation circuits that generate and output measurement signals based on the amount of change in the charge accumulated in the plurality of measurement pixels for the prescribed measurement time; and a saturation determination unit that determines whether or not one or more of the plurality of measurement signals output by the plurality of measurement signal generation circuits is greater than the reference signal output by the reference signal generation circuit, and determines that the measurement signal that is greater than the reference signal includes a saturated output.

A virtual slide device may include: a color sensor that includes: a reference pixel that accumulates a charge based on an amount of light irradiated from a test specimen; a plurality of measurement pixels that accumulate a charge based on an amount of light that is irradiated from the test specimen and has a prescribed wavelength; a drive control circuit that controls the reference pixel and the plurality of measurement pixels accumulating the charge for a prescribed measurement time; a reference signal generation circuit that generates and outputs a reference signal based on an amount of change in the charge accumulated in the reference pixel for the prescribed measurement time; a plurality of measurement signal generation circuits that generate and output measurement signals based on the amount of change in the charge accumulated in the plurality of measurement pixels for the prescribed measurement time; and a saturation determination unit that determines whether or not one or more of the plurality of measurement signals output by the plurality of measurement signal generation circuits is greater than the reference signal output by the reference signal generation circuit, and determines that the measurement signal that is greater than the reference signal includes a saturated output; an image sensor that forms an image of the test specimen based on the light irradiated from the test specimen; and an image processing unit that performs an image processing of the image of the test specimen formed by the image sensor based on the plurality of measurement signals generated by the color sensor.

According to the present invention, control is performed such that a charge is accumulated for a predetermined measurement time on a reference pixel that accumulates a charge in accordance with the amount of irradiated light that is irradiated thereon from a test specimen. Control is also performed such that a charge is accumulated for a predetermined measurement time on a plurality of measurement pixels that accumulate a charge in accordance with the amount of irradiated light of a specific wavelength that is included in the irradiated light that is irradiated thereon from a test specimen. A reference signal is then generated from the amount of change in the predetermined measurement time of the charge accumulated in the reference pixel, and is output. A plurality of measurement signals are also generated from the amount of change in the predetermined measurement time of the charge accumulated in the plurality of measurement pixels, and are output. If any one or more of the plurality of measurement signals is greater than the reference signal, then it is determined that saturation output is included in that measurement signal. Because it is possible to determine as a result of this whether or not saturation output is included in a measurement signal, it is possible to acquire spectrum information about a subject more accurately.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

First Preferred Embodiment

Figure 1:
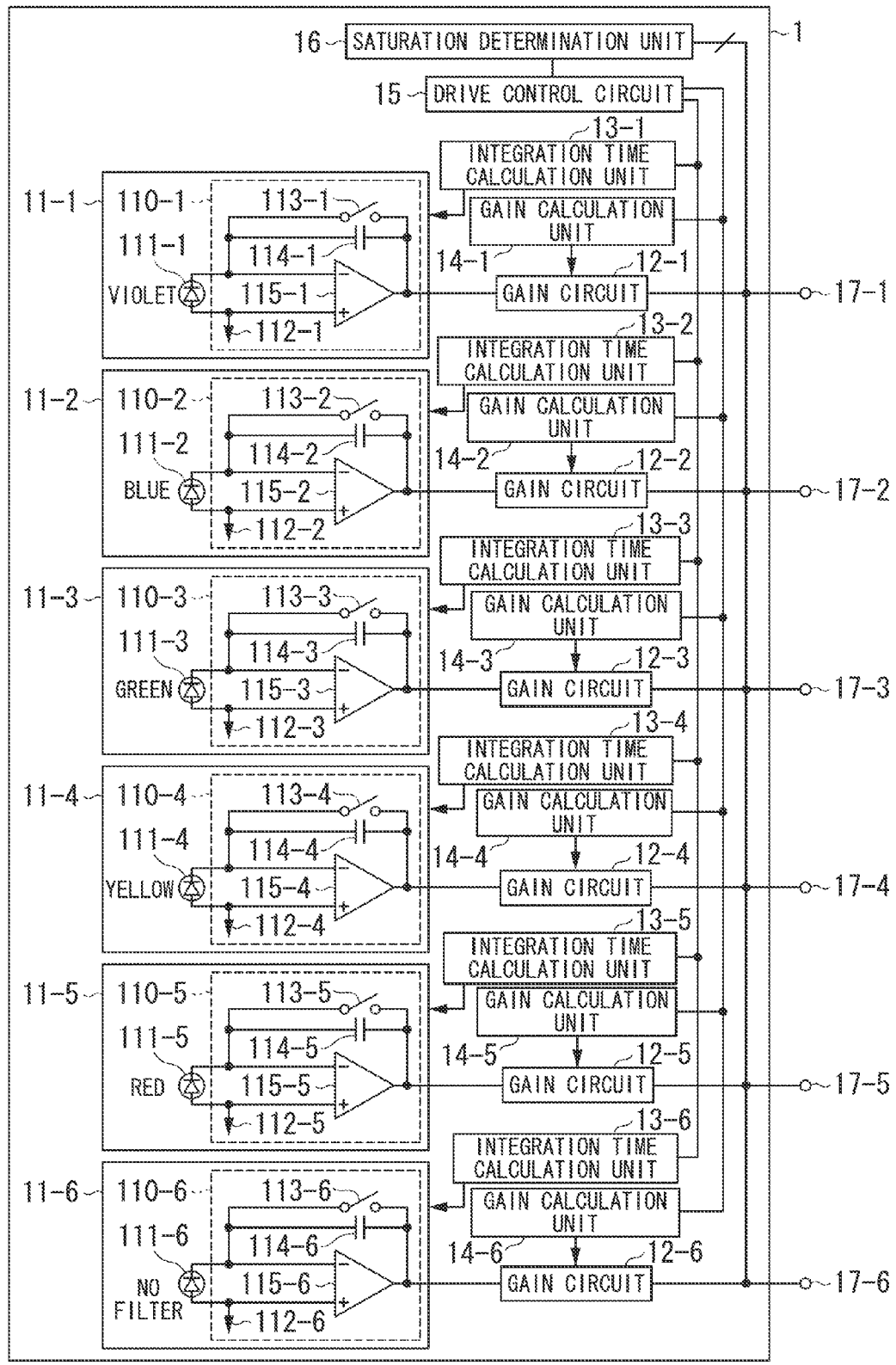
FIG. 1 is a schematic view illustrating a structure of a color sensor in accordance with a first preferred embodiment of the present invention.

A first preferred embodiment of the present invention will now be described with reference made to the drawings. FIG. 1 is a schematic view illustrating the structure of a color sensor 1 in accordance with the first preferred embodiment of the present invention. In the example shown in the drawing, the color sensor 1 includes integrated circuit units 11-1 to 11-6, gain circuits 12-1 to 12-6, integration time calculation units 13-1 to 13-6, gain calculation units 14-1 to 14-6, a drive control circuit 15, a saturation determination unit 16, and output terminals 17-1 to 17-6.

The integrated circuit units 11-1 to 11-5 include pixels 111-1 to 111-5 (i.e., measurement pixels) that detect spectrum information about a subject by dividing it into respective wavelength transmission bands, reference voltage terminals 112-1 to 112-5, switching elements 113-1 to 113-5, capacitance elements 114-1 to 114-5, and operational amplifiers 115-1 to 115-5. The integrated circuit unit 11-6 includes a pixel 111-6 (i.e., a reference pixel) that detects light from a subject, a reference voltage terminal 112-6, a switching element 113-6, a capacitance element 114-6, and an operational amplifier 115-6. Note that portions formed by the reference voltage terminals 112-1 to 112-6, switching elements 113-1 to 113-6, capacitance elements 114-1 to 114-6, and operational amplifiers 115-1 to 115-6 are called read circuits 110-1 to 110-6.

The pixel 111-1 provided in the integrated circuit unit 11-1 is a pixel on which a filter that transmits violet light has been coated so that it detects violet light. The pixel 111-2 provided in the integrated circuit unit 11-2 is a pixel on which a filter that transmits blue light has been coated so that it detects blue light. The pixel 111-3 provided in the integrated circuit unit 11-3 is a pixel on which a filter that transmits green light has been coated so that it detects green light. The pixel 111-4 provided in the integrated circuit unit 11-4 is a pixel on which a filter that transmits yellow light has been coated so that it detects yellow light. The pixel 111-5 provided in the integrated circuit unit 11-5 is a pixel on which a filter that transmits red light has been coated so that it detects red light. The pixel 111-6 provided in the integrated circuit unit 11-6 is a pixel on which no filter has been coated so that it detects all light.

The color sensor 1 irradiates light from a subject (i.e., a test specimen) onto the pixels 111-1 to 111-6. It also controls the integration time (i.e., a predetermined measurement time) in the switching elements 113-1 to 113-6 using as a reference a reference voltage which is applied to the reference voltage terminals 112-1 to 112-6, and integrates the light from the subject as voltage changes that correspond to the photoelectric current in the capacitance elements 114-1 to 114-6. It then outputs the results to output terminals of the operational amplifiers 115-1 to 115-6. These outputs are the changes in voltage that correspond to the amount of light irradiated onto the pixels 111-1 to 111-5.

The color sensor 1 amplifies the output changes from the output terminals of the operational amplifiers 115-1 to 115-5 using the gain circuits 12-1 to 12-5 (i.e., measurement signal generation circuits) while removing switching noise therefrom, and then reads them. The color sensor 1 amplifies the output change from the output terminal of the operational amplifier 115-6 using the gain circuit 12-6 (i.e., a reference signal generation circuit) while removing switching noise therefrom, and then reads it.

The integration times of each of the integrated circuit units 11-1 to 11-6 are calculated by the integration time calculation units 13-1 to 13-6 using information sent from the drive control circuit 15. The gains of the respective gain circuits 12-1 to 12-6 are calculated by the gain calculation units 14-1 to 14-6 using information sent from the drive control circuit 15. As a result of this, output signals that correspond to the integration time and the gain that are set by the integration time calculation units 13-1 to 13-6 and the gain calculation units 14-1 to 14-6 are output from the output terminals 17-1 to 17-6.

Output terminals of the gain circuits 12-1 to 12-6 are connected to the saturation determination unit 16, and output signals from the gain circuits 12-1 to 12-6 are input into the saturation determination unit 16. Based on the output signals (i.e., the measurement signals) input from the gain circuits 12-1 to 12-5 and on the output signals (i.e., the reference signal) input from the gain circuit 12-1, the saturation determination unit 16 performs saturation determination processing to determine whether or not the integrated circuit units 11-1 to 11-6 are in a saturated state. A saturated state is a state in which the amount of light of the wavelength component that is irradiated onto the color sensor 1 is equal to or more than a fixed amount of light, and in which the amount of light able to be detected by the integrated circuit units 11-1 to 11-6 has been exceeded and the output voltage values from the integrated circuit units 11-1 to 11-6 are saturated. The output voltage values from the integrated circuit units 11-1 to 11-6 at this time are taken as the saturation output. The processing steps of this saturation determination processing are described below. The drive control circuit 15 controls each unit provided in the color sensor 1. By employing this structure, the color sensor 1 is able to acquire spectrum information about a subject based on output signals from the gain circuits 12-1 to 12-5.

Figure 2:
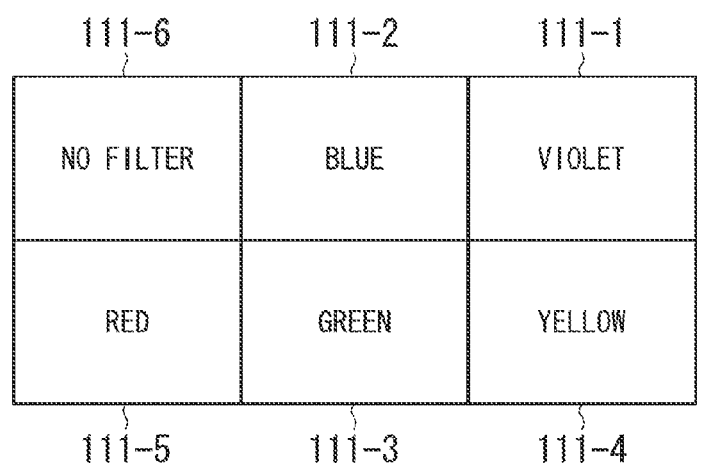
FIG. 2 is a schematic view illustrating a placement of pixels provided in the color sensor in accordance with the first preferred embodiment of the present invention.

FIG. 2 is a schematic view illustrating the placement of the pixels 111-1 to 111-6 provided in the color sensor 1 in accordance with the first preferred embodiment of the present invention. In the example shown in the drawing, the pixel 111-6 on which no filter has been coated so that it is able to detect all of the light is placed on the top left side. The pixel 111-1 on which a filter that transmits violet light has been coated so that it is able to detect violet light is placed on the top right side. The pixel 111-2 on which a filter that transmits blue light has been coated so that it is able to detect blue light is placed in the top center. The pixel 111-3 on which a filter that transmits green light has been coated so that it is able to detect green light is placed in the bottom center. The pixel 111-4 on which a filter that transmits yellow light has been coated so that it is able to detect yellow light is placed on the bottom right side. The pixel 111-5 on which a filter that transmits red light has been coated so that it is able to detect red light is placed on the bottom left side. The placement of the pixels 111-1 to 111-6 is not limited to the placement shown in the drawing, and other desired placements may also be used.

Figure 3:
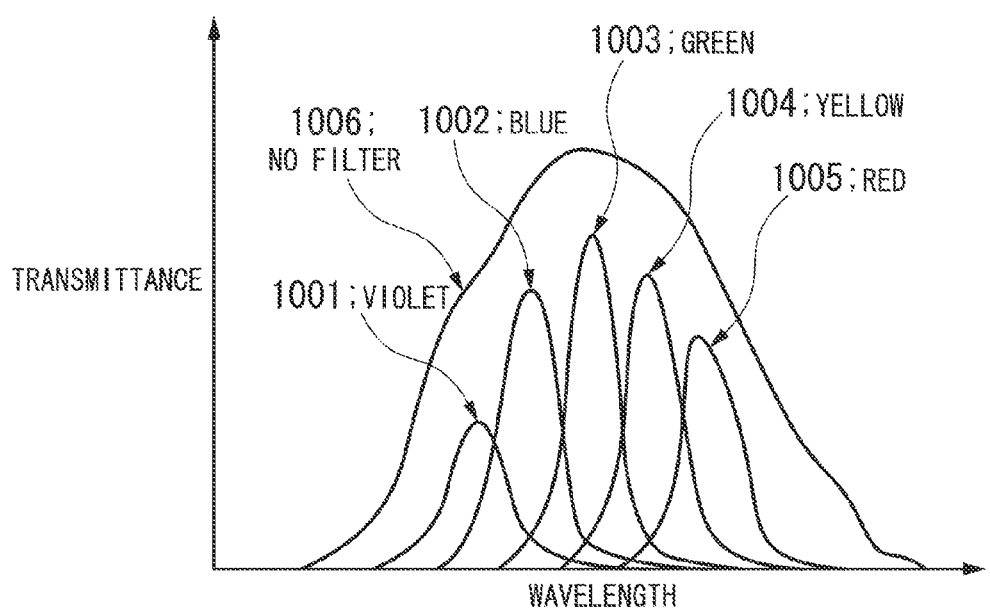
FIG. 3 is a graph illustrating spectral characteristics of the pixels in accordance with the first preferred embodiment of the present invention.

The spectral characteristics of the pixels 111-1 to 111-6 will now be described. FIG. 3 is a graph illustrating the spectral characteristics of the pixels 111-1 to 111-6 in accordance with the first preferred embodiment of the present invention. This graph shows a curve 1001 that shows the transmittance of a color filter that has been coated on the pixel 111-1 that detects violet light, a curve 1002 that shows the transmittance of a color filter that has been coated on the pixel 111-2 that detects blue light, a curve 1003 that shows the transmittance of a color filter that has been coated on the pixel 111-3 that detects green light, a curve 1004 that shows the transmittance of a color filter that has been coated on the pixel 111-4 that detects yellow light, a curve 1005 that shows the transmittance of a color filter that has been coated on the pixel 111-5 that detects red light, and a curve 1006 that shows the transmittance of light when no filter has been coated on the pixel. In this manner, the wavelengths of the light transmitted through each color filter are different. The light transmittance when no filter was coated was higher across all of the wavelength bands compared to the transmittance when a filter was coated. Because of this, compared with the outputs from the pixels 111-1 to 111-5 on which filters were coated, the output from the pixel 111-6 on which no filter was coated showed the highest output changes irrespective of the wavelength of the irradiated light.

Figure 4:
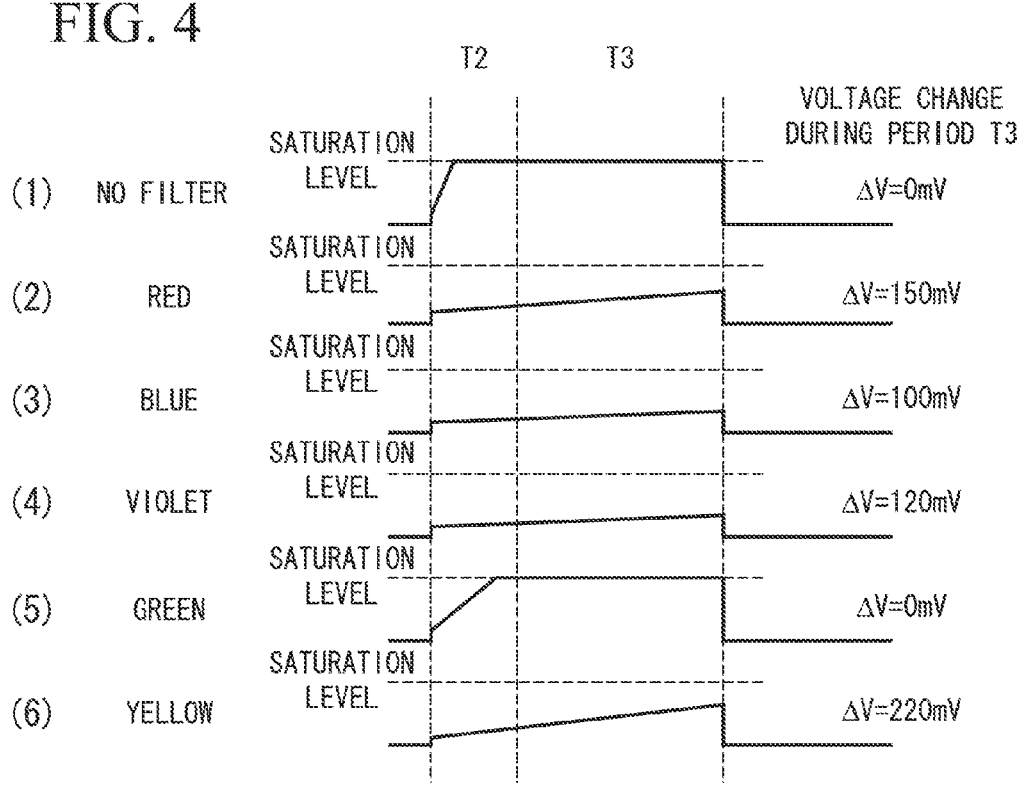
FIG. 4 is a graph illustrating output voltage values of integrated circuit units, and changes in the output voltage values of the integrated circuit units in accordance with the first preferred embodiment of the present invention.
Figure 9:
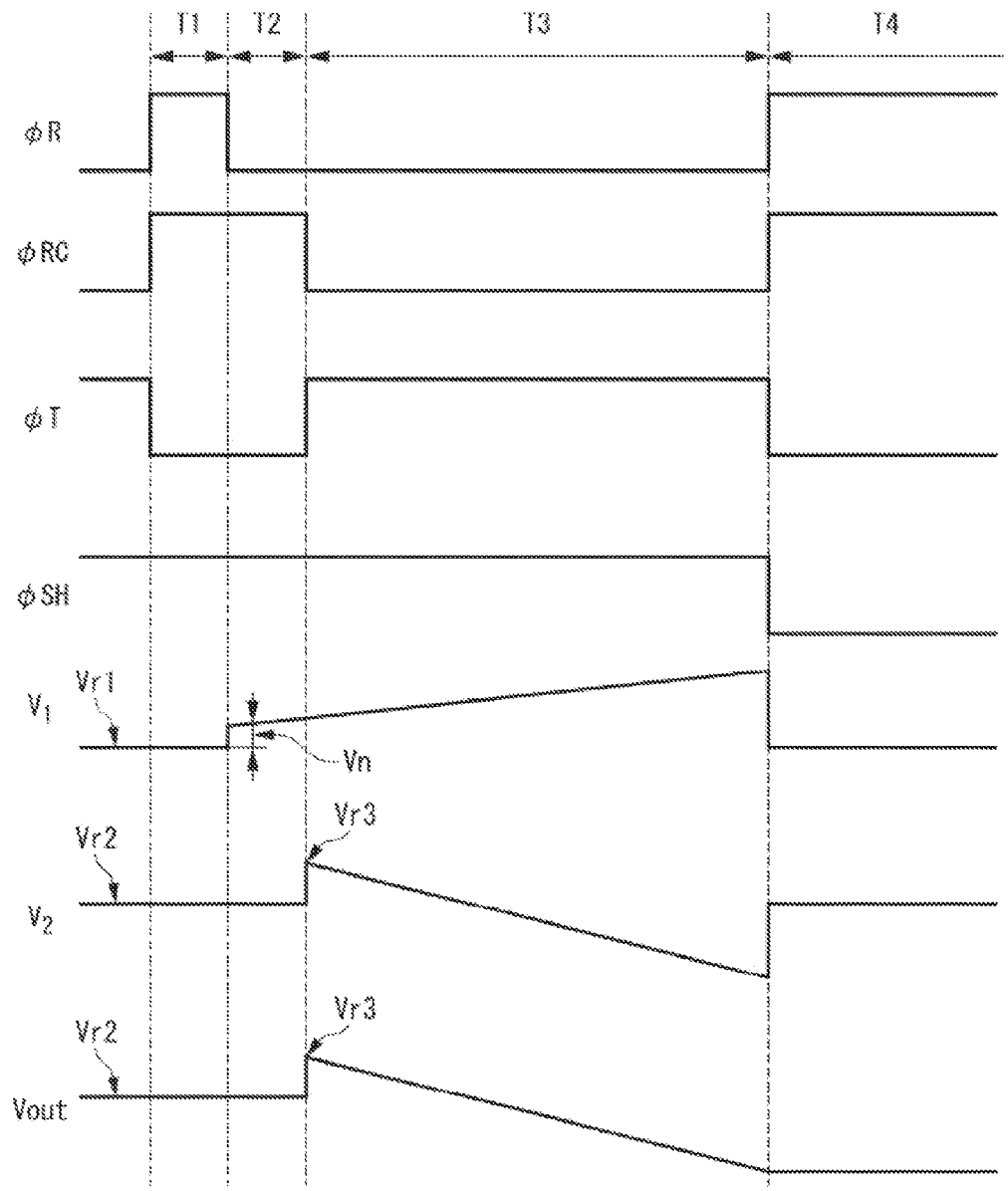
FIG. 9 is a timing chart illustrating operation timings of the solid-state imaging device in accordance with the related art.
Figure 10:
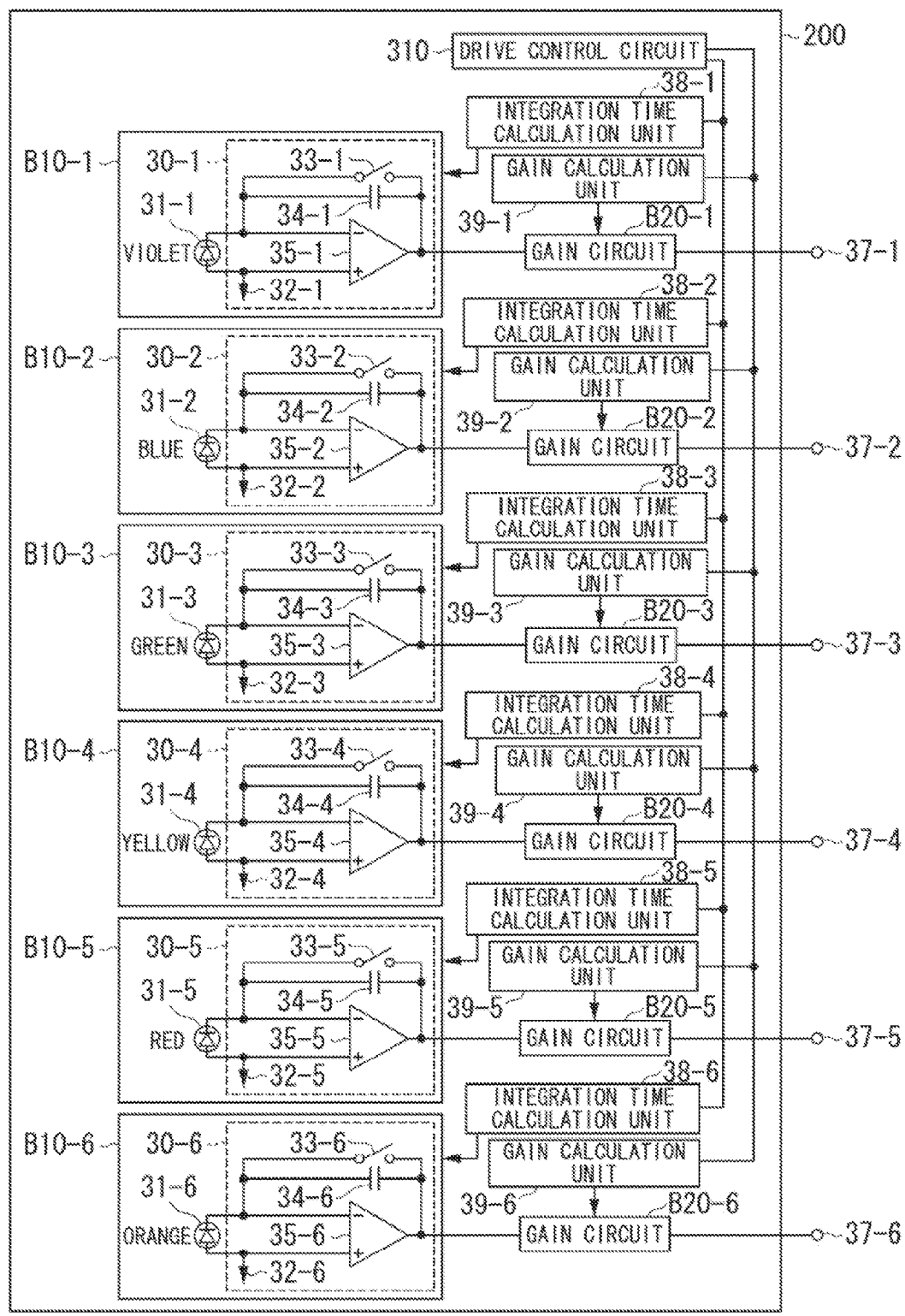
FIG. 10 is a schematic view illustrating a structure of a color sensor to which the solid-state imaging device in accordance with the related art has been applied.
Figure 11:
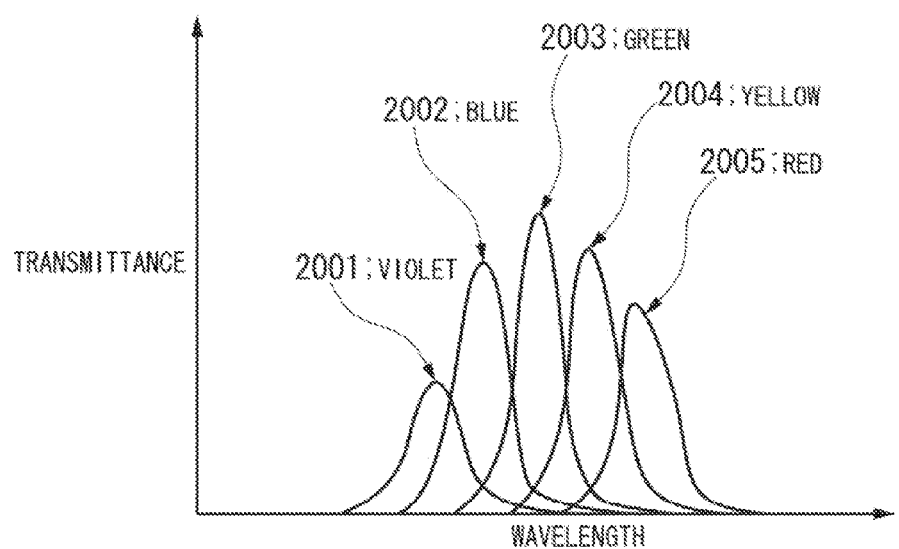
FIG. 11 is a graph illustrating spectral characteristics of a multiband color sensor in accordance with the related art.
Figure 12A:
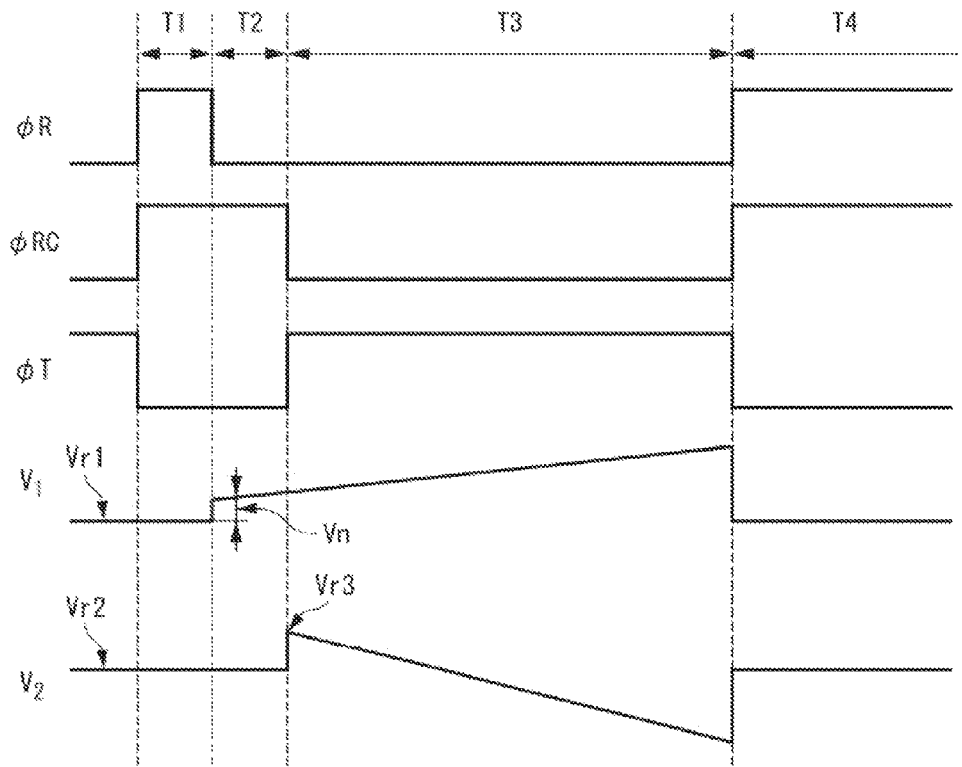
FIGS. 12A and 12B are timing charts illustrating operation timings of a color sensor to which the solid-state imaging device in accordance with the related art has been applied.
Figure 12B:
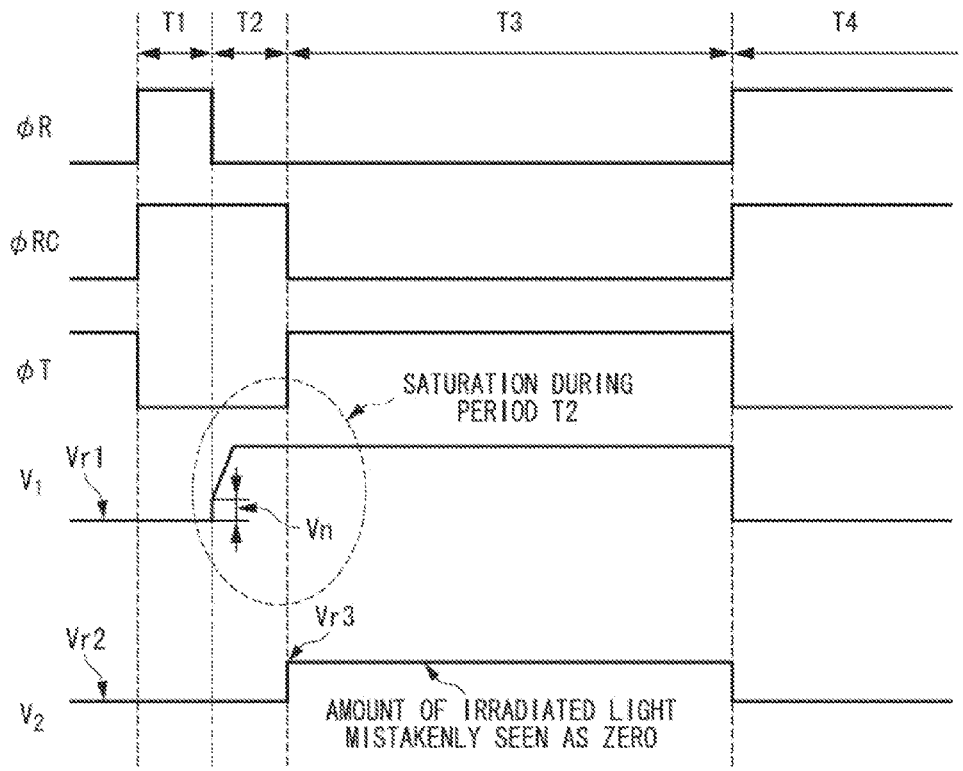
Figure 13:
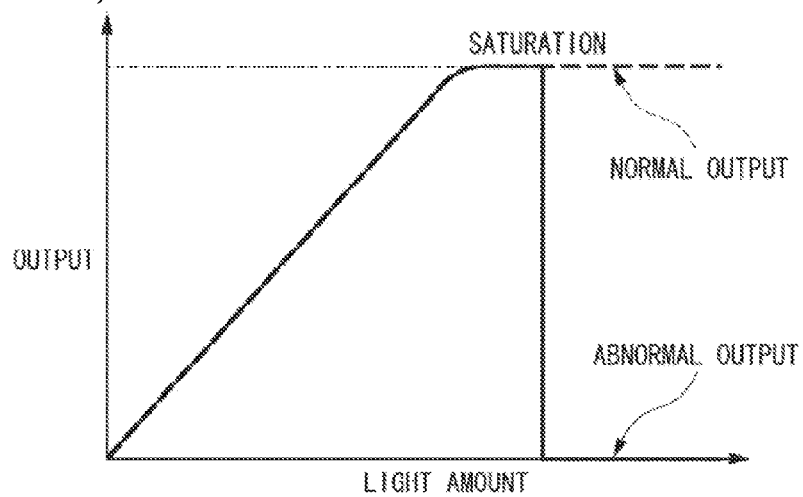
FIG. 13 is a graph illustrating a relationship between an amount of light and an output when the output from gain circuits dropped to zero when a fixed quantity or more of light was irradiated onto the color sensor in accordance with the related art.

In the first preferred embodiment, a description is given of the output voltage values of the integrated circuit units 11-1 to 11-6 when the output voltage value of one of the integrated circuit units 11-1 to 11-6 has become saturated. FIG. 4 is a graph illustrating the output voltage values of the integrated circuit units 11-1 to 11-6 during the time periods T2 and T3, and changes in the output voltage values of the integrated circuit units 11-1 to 11-6 during the time period T3. The time periods T2 and T3 are the same periods as the time periods T2 and T3 shown in FIG. 9. The changes in the output voltage values of the integrated circuit units 11-1 to 11-6 during the time period T3 correspond to the output voltage values of the gain circuits 12-1 to 12-6.

FIG. 4 (1) is a graph illustrating the output voltage value of the integrated circuit unit 11-6 which has the pixel 111-6 that detects the light of all of the colors. FIG. 4 (2) is a graph illustrating the output voltage value of the integrated circuit unit 11-5 which has the pixel 111-5 that detects red light. FIG. 4 (3) is a graph illustrating the output voltage value of the integrated circuit unit 11-2 which has the pixel 111-2 that detects blue light. FIG. 4 (4) is a graph illustrating the output voltage value of the integrated circuit unit 11-1 which has the pixel 111-1 that detects violet light. FIG. 4 (5) is a graph illustrating the output voltage value of the integrated circuit unit 11-3 which has the pixel 111-3 that detects green light. FIG. 4 (6) is a graph illustrating the output voltage value of the integrated circuit unit 11-4 which has the pixel 111-4 that detects yellow light.

As was described in the description of the related art, when a fixed amount of light or greater is irradiated onto the specific pixels 111-1 to 111-5, because the output voltage values of the integrated circuit units 11-1 to 1106 reach saturation level during the time period T2, there are zero changes in output during the time period T3. Because of this, the output voltage values of the gain circuits 12-1 to 12-6 are zero. Note that the term zero includes values adjacent to zero.

In the example shown in the drawing, the output changes from the integration circuit unit 11-6 which has the pixel 111-6 that detects light of all of the colors that are shown in FIG. 4(1), and the output changes from the integration circuit unit 11-3 which has the pixel 111-3 that detects green light that are shown in FIG. 4 (5) are both zero, while the other output changes are not zero. In this case, there is a value of zero for the output voltage of the gain circuit 12-6 which reads the output changes of the integrated circuit unit 11-6 which has the pixel 111-6 that detects light of all of the colors. In addition, there is a value of zero for the output voltage of the gain circuit 12-3 which reads the output changes of the integrated circuit unit 11-3 which has the pixel 111-3 that detects green light. The output voltage values of the gain circuits 12-1, 12-2, 12-4, and 12-5 which read the output changes of the integrated circuit units 11-1, 11-2, 11-4, and 11-5 which have the other pixels 111-1, 111-2, 111-4, and 111-5 are not zero. Namely, the values of the output voltages of the gain circuits 12-1, 12-2, 12-4, and 12-5 are larger than the value of the output voltage of the gain circuit 12-6.

However, as is shown in FIG. 3, the transmittance of the light when no filter is coated is higher across all wavelength bands than the transmittance when a color filter was coated. Because of this, in cases in which saturation has not occurred, the output voltage value of the gain circuit 12-6 which reads the output changes of the integrated circuit unit 11-6 which has the pixel 111-6 on which no filter has been coated shows the highest output change irrespective of the wavelength of the irradiated light compared with the values of the output voltages of the gain circuits 12-1 to 12-5 which read the output changes of the integrated circuit units 11-1 to 11-5 that have the pixels 111-1 to 111-5 on which filters have been coated.

As a result of this, in the example shown in FIG. 4, because the change in the output voltage values of the integrated circuit units 11-1, 111-2, 111-4, and 111-5, namely, the values of the output voltages of the gain circuits 12-1, 12-2, 12-4, and 12-5 during the period T3 are not zero, it is understood that light is being irradiated onto the color sensor 1. Accordingly, in the example shown in FIG. 4, because the value of the output voltage from the integrated circuit unit 11-6 does not reach saturation level during the time period T2, there is zero change in the output from the integrated circuit unit 11-6 during the time period T3, and it is understood that the value of the output voltage from the gain circuit 12-6 is zero. Namely, it can be understood that a false result, namely, that the amount of light irradiated onto the integrated circuit unit 11-6 is zero is output. In the same way, because the output from the gain circuit 12-3 during the time period T3 is zero, it can be understood that there is a possibility that the value of the output voltage from the integrated circuit unit 11-3 during the period T2 has become saturated.

Figure 5:
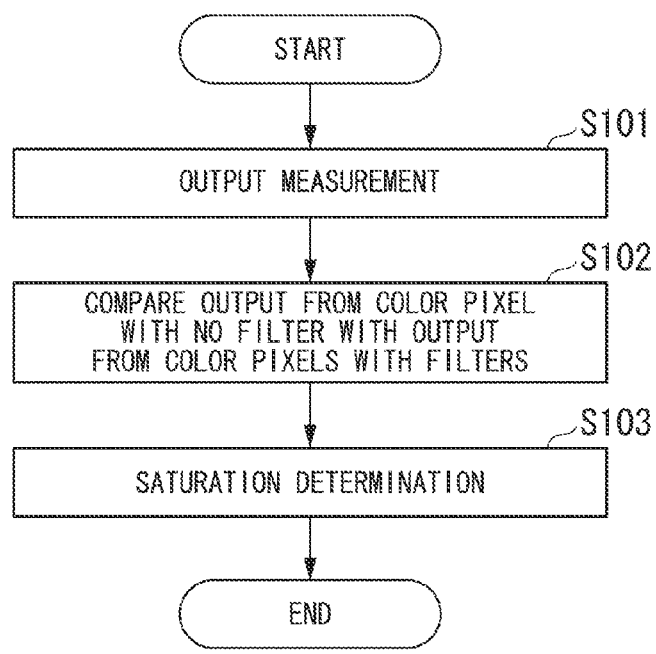
FIG. 5 is a flowchart illustrating processing steps of a saturation determination processing of a saturation determination unit in accordance with the first preferred embodiment of the present invention.

Next, the processing steps of the saturation determination processing of the saturation determination unit 16 of the first preferred embodiment will now be described. FIG. 5 is a flowchart illustrating the processing steps of the saturation determination processing of the saturation determination unit 16 in accordance with the first preferred embodiment of the present invention.

In step S101, the saturation determination unit 16 acquires output voltage values from the gain circuits 12-1 to 12-5 that read output changes from the integrated circuit units 11-1 to 11-5 that have the pixels 111-1 to 111-5 on which filters have been coated, and an output voltage value from the gain circuit 12-6 that reads the output change from the integrated circuit unit 11-6 that has the pixel 111-6 that detects light of all of the colors and on which a filter has not been coated. Thereafter, the saturation determination unit 16 moves to the processing of step S102.

In step S102, the saturation determination unit 16 compares the output voltage values of the gains circuits 12-1 to 12-5 that were acquired in step S101 with the value of the output voltage from the gain circuit 12-6. Thereafter, the saturation determination unit 16 moves to the processing of step S103.

In step S103, if, based on the result of the comparison in step S102, the value of any of the output voltages from the gain circuits 12-1 to 12-5 is greater than the value of the output voltage from the gain circuit 12-6, the saturation determination unit 16 determines that saturated output is contained therein and that a saturation state has been reached. Thereafter, the saturation determination processing is ended. If, however, the saturation determination unit 16 determines in the saturation determination processing that a saturation state has not been reached, it determines that the spectrum information acquired at this time is invalid.

As has been described above, according to the first preferred embodiment of the present invention, the saturation determination unit 16 the output voltage values from the gain circuits 12-1 to 12-5 that read changes in output from the integrated circuit units 11-1 to 11-5 that have the pixels 111-1 to 111-5 on which filters have been coated with the output voltage value from the gain circuit 12-6 that reads the change in output from the integrated circuit unit 11-6 that has the pixel 111-6 on which a filter has not been coated. If the value of any of the output voltages from the gain circuits 12-1 to 12-5 is greater than the value of the output voltage from the gain circuit 12-6, the saturation determination unit 16 determines that a saturation state has been reached. If, however, the saturation determination unit 16 determines in the saturation determination processing that a saturation state has not been reached, it determines that the spectrum information acquired at this time is invalid. As a result of this procedure, the color sensor 1 is able to accurately acquire spectrum information.

Second Preferred Embodiment

A second preferred embodiment of the present invention will now be described. The point of difference between the second preferred embodiment and the first preferred embodiment is that, in the saturation processing of the second preferred embodiment, when the values of the output voltages from the gain circuits 12-1 to 12-5 that read the changes in output from the integrated circuit units 11-1 to 11-5 that have the pixels 111-1 to 111-5 on which filters have been coated are zero, then a determination is made as to whether or not this output voltage value is a correct output voltage value. Note that the structure of the color sensor 1 of the second preferred embodiment is the same as the structure of the color sensor 1 of the first preferred embodiment.

Figure 6:
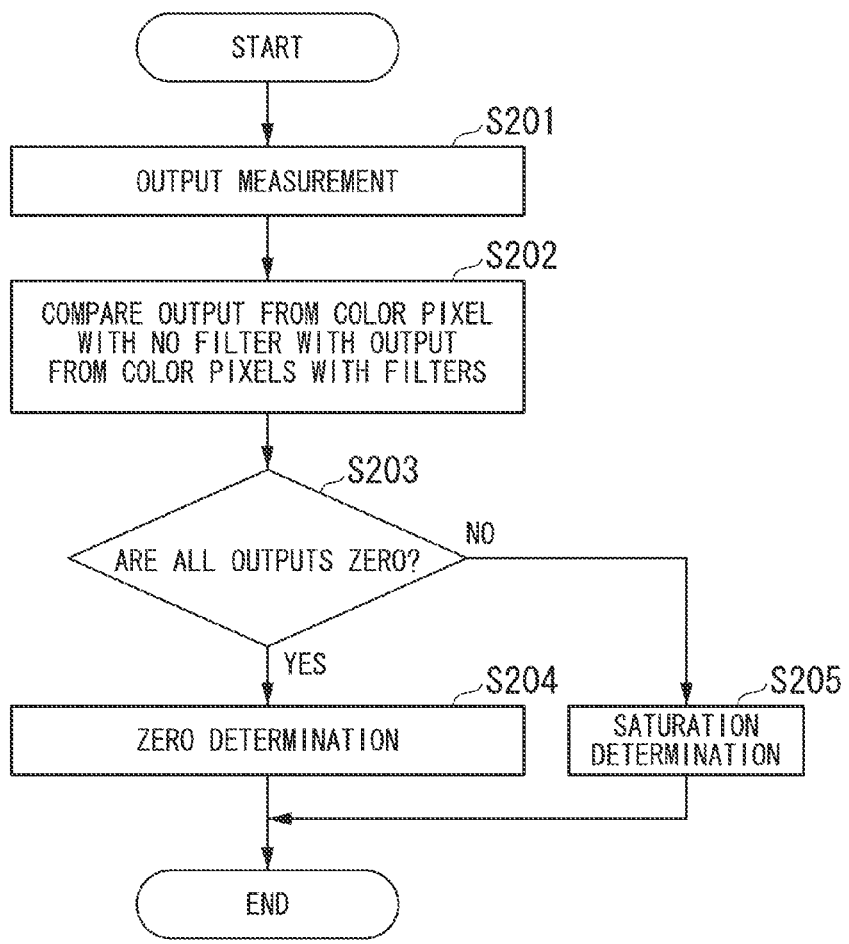
FIG. 6 is a flowchart illustrating processing steps of a saturation determination processing of a saturation determination unit in accordance with a second preferred embodiment of the present invention.

The processing steps of the saturation determination processing of the saturation determination unit 16 of the second preferred embodiment will now be described. FIG. 6 is a flowchart illustrating the processing steps of the saturation determination processing of the saturation determination unit 16 in accordance with the second preferred embodiment of the present invention.

The processing of steps S201 to S202 is the same as the processing of steps S201 to S202 of the first preferred embodiment.

In step S203, based on the result of the comparison in step S202, the determination processing unit 16 determines whether or not the values of the output voltages from the gain circuits 12-1 to 12-5 that read output changes from the integrated circuit units 11-1 to 11-5 that have the pixels 111-1 to 111-5 on which filters have been coated, and the value of the output voltage from the gain circuit 12-6 that reads output changes in the integrated circuit unit 11-6 that has the pixel 111-6 on which a filter has not been coated are all zero. If the saturation determination unit 16 determines that the values of the output voltages from the gain circuits 12-1 to 12-5 and the value of the output voltage from the gain circuit 12-6 are all zero, it moves to the processing of step S204, while in all other cases it moves to the processing of step S205.

In step S204, the saturation determination unit 16 determines that the values of the output voltages from the gain circuits 12-1 to 12-5 and the value of the output voltage from the gain circuit 12-6 are all zero (i.e., are a minimum value output). Namely, the saturation determination unit 16 determines that the values of the output voltage from the gain circuits 12-1 to 12-5 and the value of the output voltage from the gain circuit 12-6 are correct values. Thereafter, the processing is ended.

The processing of step S205 is the same as the processing of step S103 of the first preferred embodiment.

As has been described above, according to the second preferred embodiment of the present invention, when there is a value of zero for the output voltage from the gain circuit 12-6 that reads output changes in the integrated circuit unit 11-6 that has the pixel 111-6 on which a filter has not been coated, it is possible to correctly determine whether the value of the output voltage is zero because the amount of light irradiated onto the color sensor 1 was too great and caused saturation to occur, or whether the value of the output voltage is zero because the amount of light irradiated onto the color sensor 1 was too small. As a consequence, it is possible to acquire spectrum information more accurately.

Third Preferred Embodiment

A third preferred embodiment of the present invention will now be described. The point of difference between the third preferred embodiment and the first preferred embodiment is that, in the third preferred embodiment, when the saturation determination unit 16 has determined in the saturation determination processing that a state of saturation has been reached, the drive control circuit 15 lowers the photosensitivity of each of the integrated circuit units 11-1 to 11-6 so that the state of saturation is terminated, and spectrum information is once again acquired. The method used to lower the photosensitivity of the respective integrated circuit units 11-1 to 11-6 may be one in which, for example, the drive control circuit 15 controls the gain values calculated by the gain calculation units 14-1 to 14-6 such that these values are small.

As has been described above, according to the third preferred embodiment of the present invention, when the saturation determination unit 16 has determined in the saturation determination processing that a state of saturation has been reached, the drive control circuit 15 lowers the photosensitivity of each of the integrated circuit units 11-1 to 11-6 so that the state of saturation is terminated, and spectrum information is once again acquired. As a result, the color sensor 1 is able to acquire spectrum information more accurately.

Fourth Preferred Embodiment

A fourth preferred embodiment of the present invention will now be described. The point of difference between the fourth preferred embodiment and the second preferred embodiment is that, in the fourth preferred embodiment, when the saturation determination unit 16 has determined in the saturation determination processing that the value of the voltage output is zero because a small amount of light is irradiated onto the color sensor 1, the drive control circuit 15 raises the photosensitivity of each of the integrated circuit units 11-1 to 11-6, and once again acquires the spectrum information. The method used to raise the photosensitivity of the respective integrated circuit units 11-1 to 11-6 may be one in which, for example, the drive control circuit 15 controls the gain values calculated by the gain calculation units 14-1 to 14-6 such that these values are large.

As has been described above, according to the fourth preferred embodiment of the present invention, when the saturation determination unit 16 has determined in the saturation determination processing that the value of the voltage output is zero because a small amount of light is irradiated onto the color sensor 1, the drive control circuit 15 raises the photosensitivity of each of the integrated circuit units 11-1 to 11-6, and once again acquires the spectrum information. As a result, the color sensor 1 is able to acquire spectrum information more accurately.

Fifth Preferred Embodiment

Figure 7:
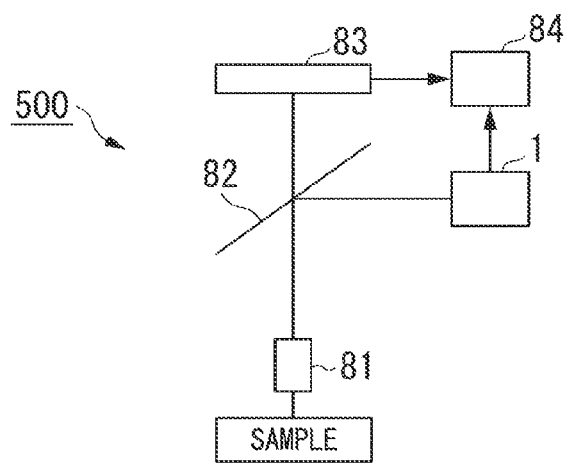
FIG. 7 is a block diagram illustrating a structure of a virtual slide device in accordance with a fifth preferred embodiment of the present invention.
Figure 8:
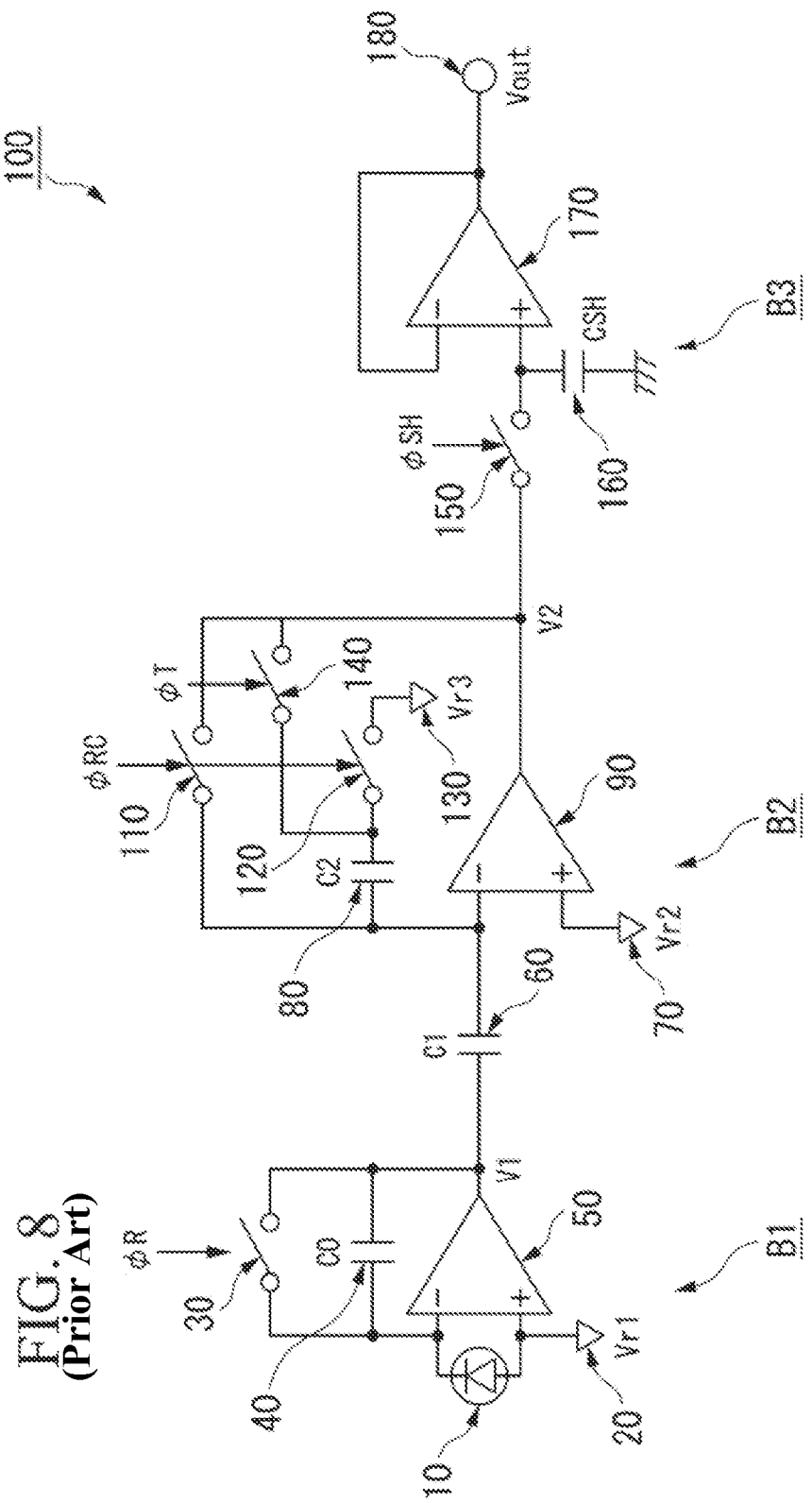
FIG. 8 is a schematic view illustrating a structure of a solid-state imaging device in accordance with the related art.

A fifth preferred embodiment of the present invention will now be described. FIG. 7 is a block diagram illustrating the structure of a virtual slide device in accordance with the fifth preferred embodiment of the present invention. In the example shown in the drawing, a virtual slide device 500 includes a color sensor 1, an objective lens 81, a half-mirror 82, an RGB image sensor 83, and an image processing unit 84.

The color sensor 1 is the same as any one of the color sensors 1 described in the first through fourth preferred embodiments, and is able to more accurately acquire spectrum information about a sample. The objective lens 81 condenses light that is irradiated onto a sample. The half-mirror 82 splits the light from the objective lens in the directions of the color sensor 1 and the RGB image sensor 83. The RGB image sensor 83 generates images based on images of a subject photographed via the objective lens 81 and the half-mirror 82. The image processing unit 84 performs image processing such as corrections and the like on images acquired by the RGB image sensor 83 based on spectrum information for the sample acquired by the color sensor 1.

As has been described above, according to the fifth preferred embodiment of the present invention, the color sensor 1 is able to acquire spectrum information about a subject more accurately. As a result, the image processing unit 84 is able to perform image processing such as corrections and the like more accurately on images acquired by the RGB image sensor 83.

A first through fifth preferred embodiment of this invention have been described above in detail with reference made to the drawings, however, the specific structure thereof is not limited to these preferred embodiments and various other designs may be considered insofar as they do not depart from the spirit or scope of this invention.

For example, in the above described examples, the color sensor 1 includes the five pixels 111-1 to 111-5 that serve as pixels on which filters have been coated, however, this invention is not limited to this and it is also possible for the color sensor to be simply provided with a plurality of pixels on which filters have been coated.

While preferred embodiments of the present invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A spectrum information measurement method comprising steps of:
controlling a reference pixel accumulating charges for a prescribed measurement time, the reference pixel accumulating the charges based on an amount of light irradiated from a test specimen;
controlling a plurality of measurement pixels accumulating the charge for the prescribed measurement time, the plurality of measurement pixels accumulating the charge based on an amount of light that is irradiated from the test specimen and has a prescribed wavelength;

generating and outputting a reference signal based on an amount of change in the charge that is accumulated in the reference pixel over the prescribed measurement time;

generating and outputting a plurality of measurement signals based on an amount of change in the charge that is accumulated in each of the plurality of measurement pixels over the prescribed measurement time;

determining whether or not any one or more of the plurality of measurement signals is greater than the reference signal, and determining that the measurement signal that is greater than the reference signal includes saturated output.

2. The spectrum information measurement method according to claim 1, further comprising a step of:

determining that each one of the plurality of measurement signals is minimum value output if the reference signal and the plurality of measurement signals are all less than a prescribed value.

3. The spectrum information measurement method according to claim 2, wherein the prescribed value is zero.

4. The spectrum information measurement method according to claim 1, further comprising a step of:

discarding the reference signal and the plurality of measurement signals and lowering sensitivities of the reference pixel and the plurality of measurement pixels if it is determined that the saturated output is contained in the plurality of measurement signals.

5. The spectrum information measurement method according to claim 2, further comprising a step of:

discarding the reference signal and the plurality of measurement signals and raising sensitivities of the reference pixel and the plurality of measurement pixels if it is determined that the minimum value output is contained in the plurality of measurement signals.

6. A color sensor comprising:

a reference pixel that accumulates a charge based on an amount of light irradiated from a test specimen;

a plurality of measurement pixels that accumulate a charge based on an amount of light that is irradiated from the test specimen and has a prescribed wavelength;

a drive control circuit that controls the reference pixel and the plurality of measurement pixels accumulating the charge for a prescribed measurement time;

a reference signal generation circuit that generates and outputs a reference signal based on an amount of change in the charge accumulated in the reference pixel for the prescribed measurement time;

a plurality of measurement signal generation circuits that generate and output measurement signals based on the amount of change in the charge accumulated in the plurality of measurement pixels for the prescribed measurement time; and a saturation determination unit that determines whether or not one or more of the plurality of measurement signals output by the plurality of measurement signal generation circuits is greater than the reference signal output by the reference signal generation circuit, and determines that the measurement signal that is greater than the reference signal includes a saturated output.

7. A virtual slide device comprising:

a color sensor that comprises:

a reference pixel that accumulates a charge based on an amount of light irradiated from a test specimen;

a plurality of measurement pixels that accumulate a charge based on an amount of light that is irradiated from the test specimen and has a prescribed wavelength;

a drive control circuit that controls the reference pixel and the plurality of measurement pixels accumulating the charge for a prescribed measurement time;

a reference signal generation circuit that generates and outputs a reference signal based on an amount of change in the charge accumulated in the reference pixel for the prescribed measurement time;

a plurality of measurement signal generation circuits that generate and output measurement signals based on the amount of change in the charge accumulated in the plurality of measurement pixels for the prescribed measurement time; and a saturation determination unit that determines whether or not one or more of the plurality of measurement signals output by the plurality of measurement signal generation circuits is greater than the reference signal output by the reference signal generation circuit, and determines that the measurement signal that is greater than the reference signal includes a saturated output;

an image sensor that forms an image of the test specimen based on the light irradiated from the test specimen; and an image processing unit that performs an image processing of the image of the test specimen formed by the image sensor based on the plurality of measurement signals generated by the color sensor.

* * * * *